US009546629B2

(12) United States Patent
Morinaga et al.

(10) Patent No.: US 9,546,629 B2
(45) Date of Patent: Jan. 17, 2017

(54) CONTROL DEVICE OF DIESEL ENGINE WITH TURBOCHARGER

(71) Applicant: Mazda Motor Corporation, Aki-gun, Hiroshima (JP)

(72) Inventors: Shinichi Morinaga, Hiroshima (JP); Issei Oiso, Hiroshima (JP); Shingo Harada, Hatsukaichi (JP); Motonori Yoshida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 883 days.

(21) Appl. No.: 13/781,208

(22) Filed: Feb. 28, 2013

(65) Prior Publication Data

US 2013/0233281 A1    Sep. 12, 2013

(30) Foreign Application Priority Data

Mar. 9, 2012 (JP) .................................. 2012-052889

(51) Int. Cl.
*F02M 51/06* (2006.01)
*F02D 41/40* (2006.01)
(Continued)

(52) U.S. Cl.
CPC ............ *F02M 51/06* (2013.01); *F02D 41/401* (2013.01); *F02B 37/004* (2013.01); *F02B 37/013* (2013.01);
(Continued)

(58) Field of Classification Search
CPC ... F02B 37/004; F02B 37/013; F02D 41/0007; F02D 41/10; F02D 41/401; F02D 41/126; F02D 41/12; F02D 41/107; F02M 51/06; Y02T 10/44
(Continued)

(56) References Cited

U.S. PATENT DOCUMENTS 5,186,139 A  *  2/1993  Matsura .................. F02B 31/08
                                              123/188.14
5,218,937 A  *  6/1993  Matsura .................. F02B 31/08
                                              123/262
(Continued)

FOREIGN PATENT DOCUMENTS

CN          1880745 A       12/2006
CN         102312745 A       1/2012
(Continued)

OTHER PUBLICATIONS

151201 SAE 2007-01-0773.*

*Primary Examiner* — Erick Solis
*Assistant Examiner* — Carl Staubach
(74) *Attorney, Agent, or Firm* — Alleman Hall McCoy Russell & Tuttle LLP (57) ABSTRACT

A control device of a diesel engine is provided. The diesel engine includes an injector for injecting fuel into a cylinder, and a turbocharger for compressing intake air by using exhaust energy. The control device includes a calculating module for setting a basic injection timing determined according to an operating state of the engine, as a timing of injecting the fuel from the injector, and an injection control module for injecting the fuel from the injector at the set basic injection timing at least while the engine is in a steady operation.

17 Claims, 8 Drawing Sheets

(51) Int. Cl.
    *F02B 37/00* (2006.01)
    *F02B 37/013* (2006.01)
    *F02D 41/10* (2006.01)
    *F02D 41/00* (2006.01)

(52) U.S. Cl.
    CPC ........... *F02D 41/0007* (2013.01); *F02D 41/10* (2013.01); *Y02T 10/44* (2013.01)

(58) Field of Classification Search
    USPC ......... 701/103–105, 110; 123/294, 299–300, 123/305, 326, 435, 456, 478, 493, 681–682
    See application file for complete search history.

(56) References Cited

U.S. PATENT DOCUMENTS

| | | | |
|---|---|---|---|
| 5,996,557 A * | 12/1999 | Muraki | F02D 41/401 |
| | | | 123/458 |
| 7,475,671 B1 * | 1/2009 | Fattic | F02D 35/026 |
| | | | 123/406.47 |
| 8,521,399 B2 * | 8/2013 | Peters | F02D 41/0025 |
| | | | 123/406.47 |
| 8,667,952 B2 * | 3/2014 | Sangkyu | F02B 37/013 |
| | | | 123/299 |
| 8,725,393 B2 * | 5/2014 | Tsuzuki | F02D 35/023 |
| | | | 700/29 |
| 9,328,690 B2 * | 5/2016 | Shibata | F02D 41/401 |
| 2006/0064228 A1 * | 3/2006 | Huang | F02D 41/0002 |
| | | | 701/104 |
| 2006/0266326 A1 | 11/2006 | Yasunaga et al. | |
| 2007/0089697 A1 * | 4/2007 | Hara | F02D 35/023 |
| | | | 123/90.15 |
| 2009/0024302 A1 | 1/2009 | Karrelmeyer et al. | |
| 2010/0071658 A1 * | 3/2010 | Soejima | F01N 13/011 |
| | | | 123/406.19 |
| 2012/0004826 A1 * | 1/2012 | Shimo | F02D 41/3035 |
| | | | 701/103 |

FOREIGN PATENT DOCUMENTS

| | | | | |
|---|---|---|---|---|
| JP | 01008340 A | * | 1/1989 | ............ F02D 43/00 |
| JP | 10-274088 A | | 10/1998 | |
| JP | 10274088 | | 10/1998 | |

* cited by examiner

CONTROL DEVICE OF DIESEL ENGINE WITH TURBOCHARGER

BACKGROUND

The present invention relates to a device for controlling a diesel engine including injectors for injecting fuel into cylinders, and a turbocharger for compressing intake air by using exhaust energy.

Generally, diesel engines in which fuel is injected into cylinders which is increased in temperature and pressure by being compressed for self ignition excel in thermal efficiency compared to spark-ignition engines (e.g., gasoline engines), and have a lower discharge amount of $CO_2$. Therefore, recently, such diesel engines have been widely familiarized not only as engines for large-sized vehicles (e.g., trucks), but also for passenger vehicles.

As control devices of such diesel engines, for example, JP1998-274088A discloses a control device that has been known. As disclosed in JP1998-274088A, in a diesel engine, an injection amount and an injection timing of fuel to be injected into a cylinder is determined based on an engine load and an engine speed, and the fuel injection amount is increased as the engine speed and the engine load become higher.

As described above, even though the fuel injection amount and the fuel injection timing are determined according to the engine load and speed, when the engine load is rapidly changed by, for example, a rough accelerator operation, there is a possibility that a maximum in-cylinder pressure determined by an amount of compressed air or an amount of heat of combustion inside the cylinder temporarily becomes excessively high. Especially, because the diesel engine in JP1998-274088A is provided with a turbocharger including a turbine driven by exhaust energy and a compressor for compressing intake air, a turbocharging amount may be excessively large due to a response delay of the turbocharger, and such phenomenon as described above (the excessive increase of the maximum in-cylinder pressure) easily occurs.

SUMMARY

The present invention is made in view of the above situations and provides a control device of a diesel engine with a turbocharger, which can effectively prevent an excessive increase of a maximum in-cylinder pressure caused due to a response delay of the turbocharger, and increase reliability of the engine.

According to one aspect of the invention, a control device of a diesel engine is provided. The diesel engine includes an injector for injecting fuel into a cylinder, and a turbocharger for compressing intake air by using exhaust energy. The control device includes a calculating module for setting a basic injection timing determined according to an operating state of the engine, as a timing of injecting the fuel from the injector, and an injection control module for injecting the fuel from the injector at the set basic injection timing at least while the engine is in a steady operation. Under a condition in which an engine speed is fixed, the basic injection timing when an engine load is low is set to be more advanced than when the engine load is high. The injection control module performs a safety injection control of injecting the fuel at a safe injection timing that is set to be more retarded than the basic injection timing, only for a period of time from when the engine load is shifted from the high engine load to the low engine load.

According to this aspect, when shifting from the high engine load to the low engine load, the safety injection control of temporarily delaying the timing of the injection from the injector is performed. Thus, even when a response delay occurs in which a reduction of the turbocharging amount delays with respect to a reduction of the engine load, an excessive increase of a maximum in-cylinder pressure (a maximum in-cylinder pressure) of the engine is prevented. Therefore, even when a turbocharger with a high turbocharging performance is used, the engine can surely be protected from being damaged in its components, such as the piston and the cylinder head, and the reliability of the engine can be increased.

The injection control module may perform the safety injection control when the engine speed is above a reference speed that is higher than an idle speed and the engine load is shifted from the high engine load to the low engine load.

According to this configuration, within the speed range where the turbocharger is substantially operated (the speed range excluding at least an extremely low speed range), the excessive increase of the maximum in-cylinder pressure due to the response delay of the turbocharger as described above can suitably be avoided by the safety injection control.

The turbocharger may include a small turbocharger and a large turbocharger which is larger than the small turbocharger. The large turbocharger may be operated at least when the engine speed is above the reference speed.

According to this configuration, at least within the range where the large turbocharger is operated, the safety injection control can be expected to be performed. Thus, even when a large turbocharger with a large mass in which a response delay easily occurs is provided to the engine, the engine can surely be protected by preventing an excessive increase of the maximum in-cylinder pressure.

The safe injection timing may be determined by the calculating module in consideration of a maximum in-cylinder pressure that is a maximum in-cylinder pressure of the engine. Based on various parameters including at least an intake air pressure of the engine and an injection amount of the fuel, the calculating module may calculate, as the safe injection timing, a fuel injection timing at which the maximum in-cylinder pressure matches with a predetermined allowable value.

According to this configuration, in the safety injection control, the fuel is injected at a limit timing at which the maximum in-cylinder pressure does not exceed the allowable value. Thus, a power down of the engine caused due to the injection timing being retarded more than necessary can effectively be prevented.

A geometric compression ratio of the engine may be set below 16:1.

In the diesel engine of which the geometric compression ratio is below 16:1, the maximum in-cylinder pressure can be suppressed lower than the conventional diesel engines (generally, the compression ratio is 18:1 or higher). Moreover, in the invention, because the excessive increase of the maximum in-cylinder pressure is suppressed by the safe injection control, the strength required for the engine can be reduced compared to the conventional engines and the reduction in weight and cost of the engine can be achieved.

In view of improving ignitability of such an engine with a low compression ratio, the injection control module may perform a main injection causing a main combustion that is started near a compression top dead center, and a pilot injection causing a preliminary combustion before the main combustion. Here, because the increase of the maximum in-cylinder pressure is most influenced by the man injection, the safety injection timing set in the safety injection control may include at least a timing of the main injection.

DETAILED DESCRIPTION OF EMBODIMENT (1) Overall Configuration of Engine

Figure 1:
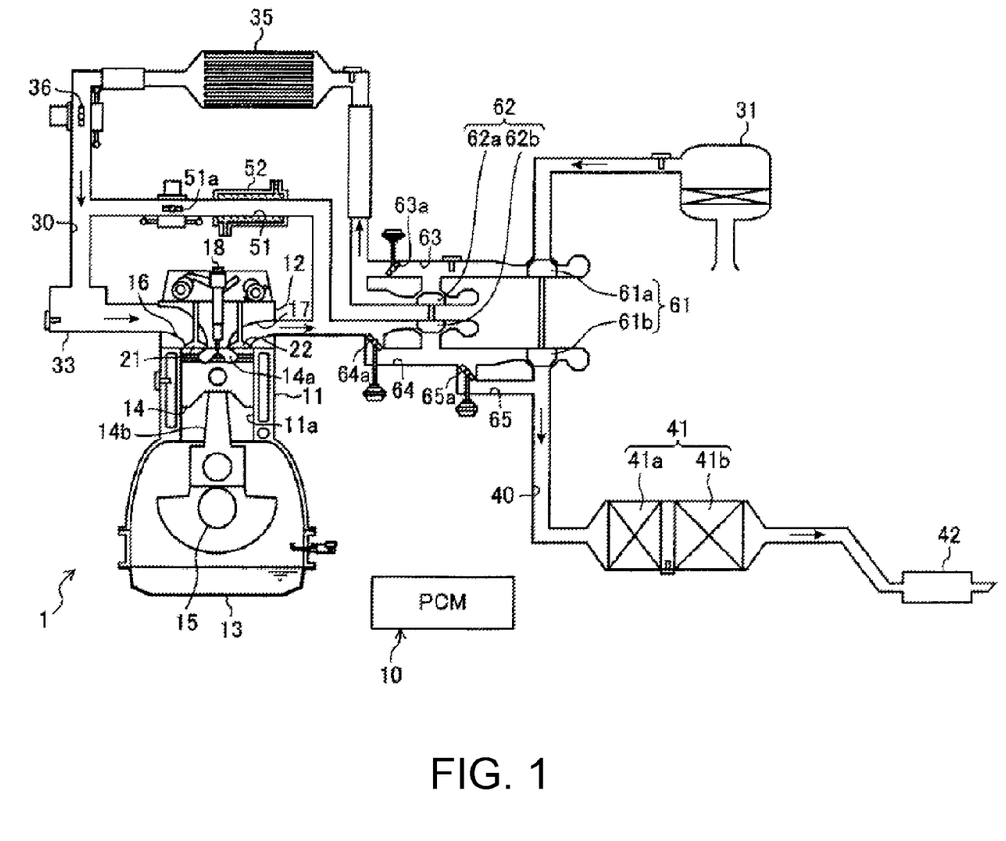
FIG. 1 is a diagram showing an overall configuration of a diesel engine with a turbocharger applied with a control device of one embodiment of the invention.

FIG. 1 is a diagram showing an overall configuration of a diesel engine with a turbocharger applied with a control device of one embodiment of the invention. The diesel engine shown in FIG. 1 is a four-cycle diesel engine installed in a vehicle as its power source for traveling. An engine body 1 of the engine is an in-line multi-cylinder type, and includes a cylinder block 11 having a plurality of cylinders 11a (only one cylinder is illustrated in FIG. 1), a cylinder head 12 arranged on the cylinder block 11, and an oil pan 13 arranged under the cylinder block 11 and storing lubricant.

Inside the cylinders 11a of the engine body 1, pistons 14 are reciprocatably inserted, and cavities partitioning reentrant combustion chambers 14a are formed in top faces of the pistons 14, respectively.

Each of the pistons 14 is coupled to a crankshaft 15 via a connecting rod 14b, and the crankshaft 15 rotates about its central axis according to a reciprocating motion of the pistons 14.

In the cylinder head 12, an intake port 16 and an exhaust port 17 opening in the combustion chamber 14a are formed and an intake valve 21 for opening and closing the intake port 16 and an exhaust valve 22 for opening and closing the exhaust port 17 are arranged for each of the cylinders 11a.

Inside the cylinder head 12, injectors 18 for injecting fuel of which a main component is diesel fuel are provided one for each cylinder 11a. Each injector 18 is arranged so that a hole (fuel injection port) formed in its tip is exposed to the cavity in the top face of the piston 14, and the injector 18 injects the fuel to the combustion chamber 14a at a suitable timing between before and after a compression top dead center (when compression stroke ends).

Here, a geometric compression ratio (a ratio of a combustion chamber volume when the piston 14 is at a bottom dead center (BDC) with the combustion chamber volume when the piston 14 is at a top dead center (TDC)) of the engine body 1 of this embodiment is set to 14:1. In other words, in this embodiment, the geometric compression ratio is set as significantly low as 14:1 while geometric compression ratios of general in-vehicle diesel engines are set to 18:1 or higher in many cases.

An intake passage 30 is connected to one side face of the engine body 1 so as to communicate with the intake ports 16 of the cylinders 11a, and an exhaust passage 40 is connected to the other side face of the engine body 1 so as to communicate with the exhaust ports 17 of the cylinders 11a. Thus, the intake air from outside is introduced into the combustion chambers 14a through the intake passage 30 and the intake ports 16, and exhaust gas (combusted gas) generated within the combustion chambers 14a is discharged outside through the exhaust ports 17 and the exhaust passage 40.

A large turbocharger 61 and a small turbocharger 62 are arranged between the intake passage 30 and the exhaust passage 40.

The large turbocharger 61 has a compressor 61a arranged in the intake passage 30, and a turbine 61b coaxially coupled to the compressor 61a and arranged within the exhaust passage 40.

Similarly, the small turbocharger 62 has a compressor 62a arranged in the intake passage 30, and a turbine 62b coaxially coupled to the compressor 62a and arranged within the exhaust passage 40.

The large and small turbochargers 61 and 62 are driven by the exhaust energy and compress the intake air. Specifically, while the engine is in operation, when the exhaust gas at high temperature passes the exhaust passage 40 at high velocity, the turbines 61b and 62b of the large and small turbochargers 61 and 62, which rotate by receiving the energy of the exhaust gas, as well as the compressors 61a and 62a coupled thereto rotate simultaneously. In this manner, the air passing through the intake passage 30 (intake air) is compressed to have a high pressure, and fed to the respective cylinders 11a of the engine body 1.

The compressor 61a and the turbine 61b of the large turbocharger 61 are formed larger in size than the compressor 62a and the turbine 62b of the small turbocharger 62. Especially, because the turbine provided in the exhaust passage 40 is made of, for example, a heat-resistant alloy, a mass (inertia) of the turbine 61a of the large turbocharger 61 is larger than the turbine 62b of the small turbocharger 62.

The compressor 61a of the large turbocharger 61 is arranged in the intake passage 30 upstream of the compressor 62a of the small turbocharger 62, and the turbine 61b of the larger turbocharger 61 is arranged in the exhaust passage 40 downstream of the turbine 62b of the small turbocharger 62.

An intake bypass passage 63 for bypassing the compressor 62a of the small turbocharger 62 is connected with the intake passage 30, and an intake bypass valve 63a for being opened and closed is connected with the intake bypass passage 63.

A first exhaust bypass passage 64 for bypassing the turbine 62b of the small turbocharger 62 and a second exhaust bypass passage 65 for bypassing the turbine 61b of the large turbocharger 61 are connected with the exhaust passage 40. A regulation valve 64a and wastegate valve 65a for being opened and closed are arranged in the first exhaust bypass passage 64 and the exhaust bypass passage 65, respectively.

An air cleaner 31 for filtrating the intake air is provided in an upstream end part of the intake passage 30, and a surge tank 33 is provided near a downstream end of the intake passage 30 (near the engine body 1). A part of the intake passage 30 downstream of the surge tank 33 is branched to be independent passages extending toward the respective cylinders 11a, and downstream ends of the independent passages are connected with the respective intake ports 16 of the cylinders 11a.

The compressor 61a of the large turbocharger 61, the compressor 62a of the small turbocharger 62, an intercooler 35 for cooling air compressed by the compressors 61a and 62a, and a throttle valve 36 for being opened and closed to adjust a cross-sectional area of the intake passage 30 are provided in this order from the upstream side in the intake passage 30 between the air cleaner 31 and the surge tank 33. Note that, the throttle valve 36 is basically fully opened or kept at a large opening close to fully opened while the engine is in operation, and is closed only when needed, for example, when the engine is stopped.

A part of the exhaust passage 40 on the upstream side adjacent to the engine body 1 is constituted with as an exhaust manifold including independent passages branched to communicate with the exhaust ports 17 of the respective cylinders 11a and a merging part where the independent passages merge together.

In a part of the exhaust passage 40 downstream of the exhaust manifold, the turbine 62b of the small turbocharger 62, the turbine 61b of the large turbocharger 61, an exhaust emission control device 41 for purifying the exhaust gas containing hazardous components, and a silencer 42 for reducing exhaust sounds are arranged in this order from the upstream side.

The exhaust emission control device 41 includes an oxidation catalyst 41a having a function of oxidizing CO and HC contained within the exhaust gas, and a DPF 41b having a function of capturing PM (soot) contained within the exhaust gas.

An EGR passage 51 for re-circulating a part of the exhaust gas to the intake passage 30 is provided between the intake and exhaust passages 30 and 40. Specifically, the intake passage 30 between the surge tank 33 and the throttle valve 36 and the exhaust passage 40 between the exhaust manifold and the turbine 62b of the small turbocharger 62 are connected with each other via the EGR passage 51. Moreover, the EGR passage 51 is provided with an EGR valve 51a for being opened and closed to adjust a re-circulation amount of the exhaust gas to the intake passage 30, and an EGR cooler 52 for cooling the exhaust gas by a coolant of the engine.

(2) Control System

The engine configured as described above is controlled by a powertrain control module (hereinafter, may be referred to as the PCM) 10. The PCM 10 is configured by a CPU, a memory, a counter timer group, an interface, and a microprocessor with paths for connecting these units.

Figure 2:
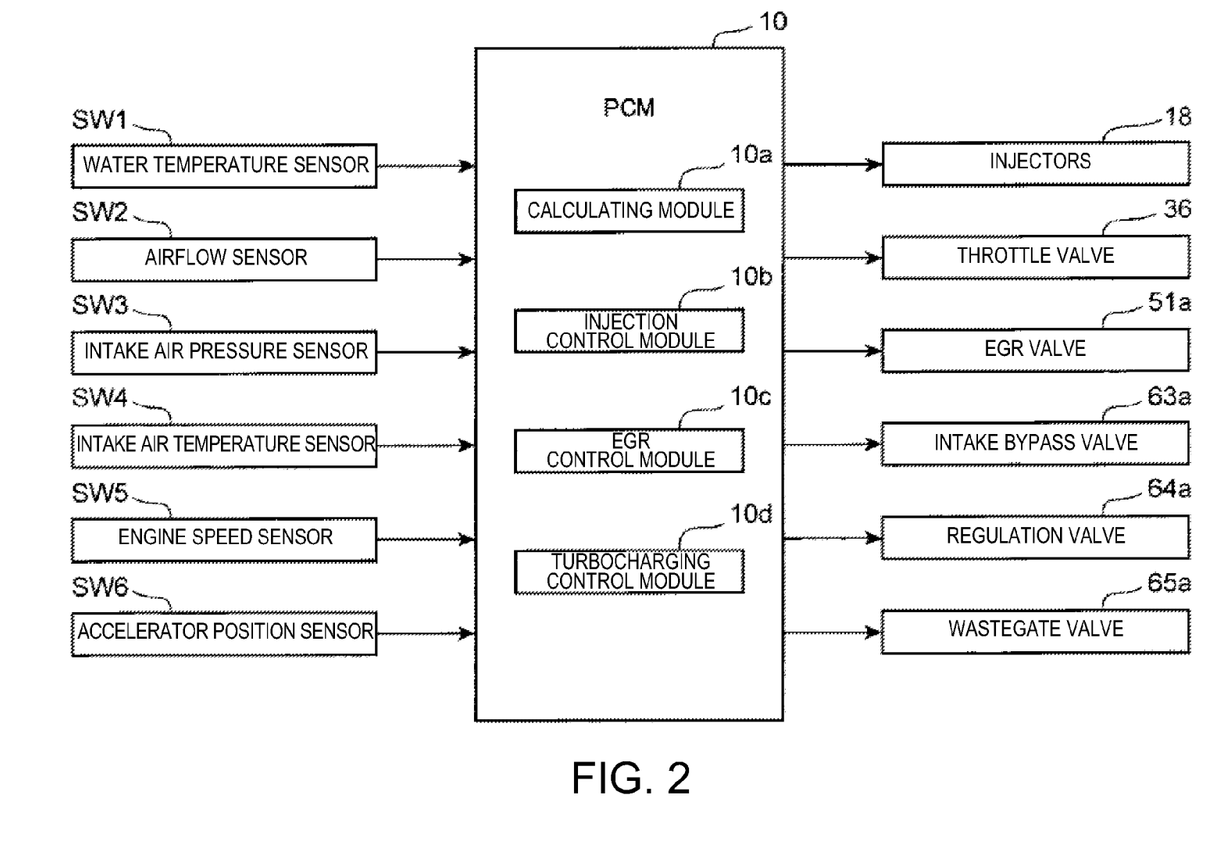
FIG. 2 is a block diagram showing a control system of the engine.

The PCM 10 is inputted with various signals from various sensors shown in FIG. 2. Specifically, either one of the engine and the vehicle is provided with a water temperature sensor SW1 for detecting a temperature of a coolant of the engine body 1 (engine water temperature), an airflow sensor SW2 for detecting a flow rate of the intake air passing through the intake passage 30 (intake air amount), an intake air pressure sensor SW3 for detecting a pressure of the intake air inside the surge tank 33 (intake air pressure), an intake air temperature sensor SW4 for detecting a temperature of the intake air (intake air temperature), an engine speed sensor SW5 for detecting a rotational speed of the crankshaft 15 of the engine body 1 (engine speed), an accelerator position sensor SW6 for detecting an accelerator opening corresponding to an angle of an acceleration pedal (not illustrated) of the vehicle. The sensors SW1 to SW6 are electrically connected with the PCM 10. The PCM 10 acquires various information, such as the engine water temperature, the intake air flow rate, the intake air pressure, the intake air temperature, the engine speed, and the accelerator opening, based on the input signals from the sensors SW1 to SW6.

The PCM 10 controls respective components of the engine while performing various calculations based on the input signals from the sensors SW1 to SW6. Specifically, the PCM 10 is electrically connected with the injectors 18, the throttle valve 36, the EGR valve 51a, the intake bypass valve 63a, the regulation valve 64a, and the wastegate valve 65a, and outputs drive control signals to these components based on, for example, the result of the calculations.

A specific function of the PCM 10 is described. As shown in FIG. 2, the PCM 10 functionally includes a calculating module 10a, an injection control module 10b, an EGR control module 10c, and a turbocharging control module 10d.

The calculating module 10a performs the various calculations based on the detection signals from the sensors SW1 to SW6, and determines states of the engine and vehicle.

The injection control module 10b controls the injectors 18 so that the fuel is injected into the respective cylinders 11a according to an injection amount and an injection timing determined by the calculations by the calculating module 10a. Note that, a specific content of a control of injecting the fuel from the injectors 18 is described in the later described section "(3) Fuel Injection Control."

The EGR control module 10c adjusts the amount of the exhaust gas to be re-circulated back to the intake passage 30 from the exhaust passage 40 (EGR amount) by controlling an opening of the EGR valve 51a.

The turbocharging control module 10d controls the operations of the large and small turbochargers 61 and 62 by controlling openings of the intake bypass valve 63a, the regulation valve 64a, and the wastegate valve 65a.

Figure 3:
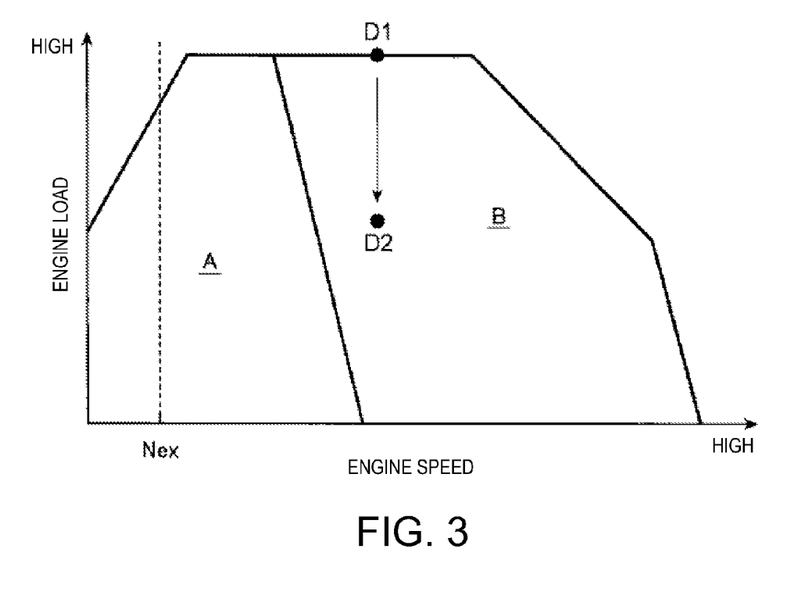
FIG. 3 is a chart showing one example of a control map used in a control of the turbocharger.

The operation switch (on and off) of the turbochargers 61 and 62 is performed based on a control map shown in FIG. 3. In FIG. 3, a first range A located on a relatively low engine speed side is set as an operating range where both the large and small turbochargers 61 and 62 operate. On the other hand, a second range B located on a relatively higher engine speed side than the first range A is set as an operating range where only the large turbocharger 61 operates. The calculating module 10a determines, between the first and second ranges A and B, the operating range where the engine is operated, and based on the result, the turbocharging control module 10d controls the valves 63a, 64a and 65a.

Specifically, within the first range A on the low engine speed side, both the large and small turbochargers 61 and 62 are operated by basically fully closing the intake bypass valve 63a, the regulation valve 64a, and the wastegate valve 65a. On the other hand, within the second range B on the high engine speed side, the exhaust gas amount is comparatively large and the turbine 62b of the small turbocharger 62 functions as an exhaust resistor. Therefore, only the large turbocharger 61 is operated and the small turbocharger 62 is not operated by fully closing the wastegate valve 65a while the intake bypass valve 63a and the regulation valve 64a are fully opened. Note that, within the second range B, the wastegate valve 65a may temporarily be opened to prevent an excessive rotation of the large turbocharger 61.

(3) Fuel Injection Control

Figure 4:
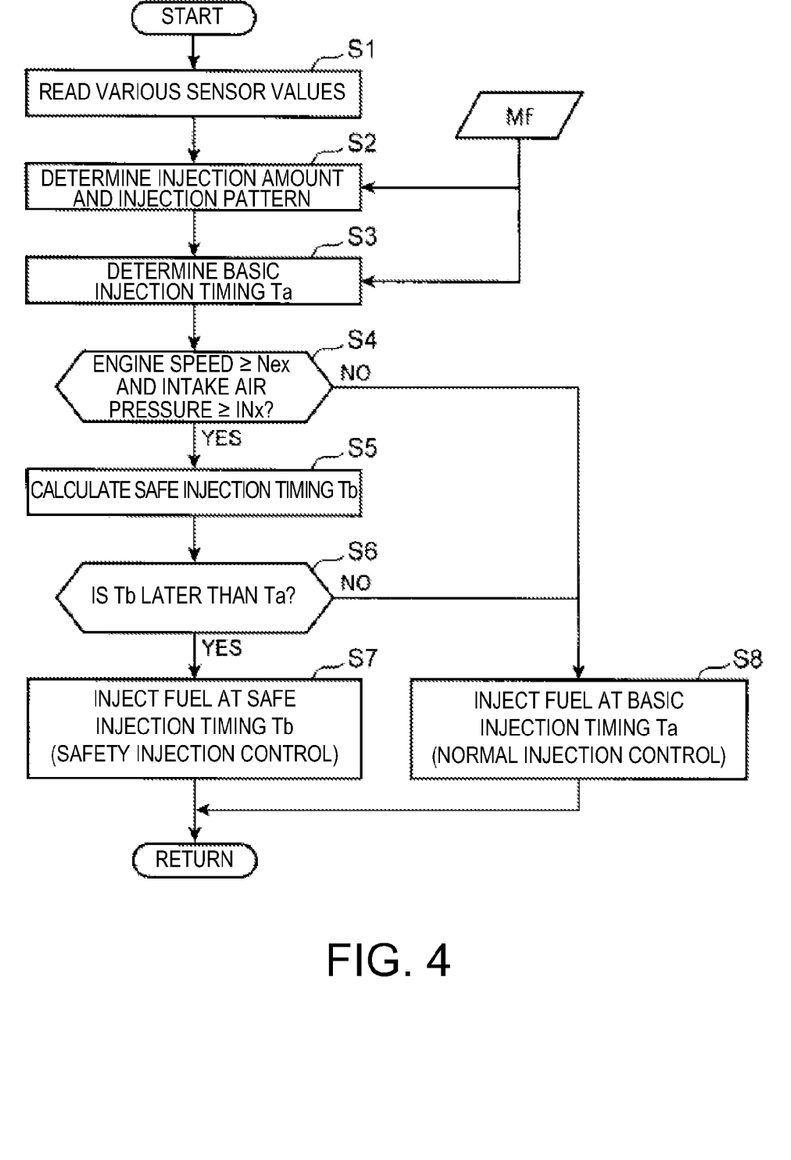
FIG. 4 is a flowchart showing a specific content of a control of injecting fuel into a combustion chamber of the engine (fuel injection control).

Next, the specific content of the fuel injection control performed by the PCM 10 while the engine is in operation is described using the flowchart in FIG. 4.

When the processing shown in FIG. 4 is started, the calculating module 10a of the PCM 10 reads the various sensor values (Step S1). Specifically, the calculating module 10a reads the detection signals from the water temperature sensor SW1, the airflow sensor SW2, the intake air pressure sensor SW3, the intake air temperature sensor SW4, the engine speed sensor SW5, and the accelerator opening sensor SW6, and based on these signals, the calculating module 10a acquires information, such as the engine coolant temperature, the intake air amount, the intake air temperature, the engine speed, and the accelerator opening.

Subsequently, based on the various information acquired at Step S1, the calculating module 10a determines the injection amount and an injection pattern of the fuel to be injected from each injector 18 and determines a basic injection timing Ta at which the fuel is basically injected (Steps S2 and S3). These injection amount, the injection pattern, and the injection timing (basic injection timing Ta) are determined with reference to a fuel injection map Mf in which a suitable mode of the fuel injection according to various parameters (e.g., accelerator opening and the engine speed) is determined. Specifically, with reference to the fuel injection map Mf, the fuel injection amount is determined based at least on the accelerator opening (i.e., a required torque of the engine), and the injection pattern and the injection timing of the fuel are determined based at least on the determined injection amount and the engine speed. Here, the injection amount, the injection pattern, and/or the injection timing are corrected depending on, for example, the intake air temperature and the engine water temperature.

Figure 5:
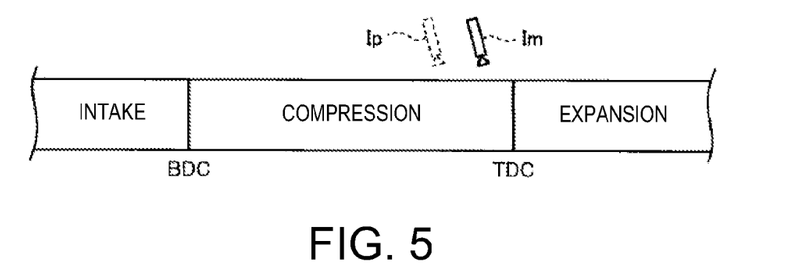
FIG. 5 is a schematic view showing one example of a fuel injection pattern.

Here, the injection pattern referred to at Step S2 means the number obtained by dividing the injection amount of the fuel to be injected from the injector 18 by a ratio of the injection amount. Specifically, in this embodiment, as schematically shown in FIG. 5, at least two fuel injections Ip and Im referred to as a pilot injection and a main injection are performed within many operating ranges. The main injection Im means injecting the fuel slightly before or after the compression TDC so that the injected fuel starts combusting near the combustion TDC. The pilot injection Ip means injecting a small amount of fuel before the main injection Im to cause a preliminary combustion before the combustion based on the main injection Im (main combustion). Note that, an additional fuel injection referred to as an after injection may also be performed after the main injection Im depending on the operating range.

In determining the injection pattern at Step S2, for example, it is determined whether to inject the fuel once by the pilot injection Ip, twice by the pilot and main injections Ip and Im, or three times with the additional injection by the after injection, and moreover, when the injection is performed a plurality of times, a dividing ratio of the injection amount is also determined.

On the other hand, at Step S3, a suitable timing is determined as the basic injection timing Ta, with consideration of the required torque, the fuel consumption, and an EM (emission efficiency), etc. Specifically, the fuel injection map Mf stores suitable timings with consideration of, for example, the torque and the fuel consumption for various conditions, and the injection timing which matches a current operating condition is read out from thereamong to be determined as the basic injection timing Ta. Therefore, at least while the engine is in a steady operation, the basic injection timing Ta is naturally adopted as the injection timing of the injector 18.

Note that, when the injection pattern includes a plurality of injections (e.g., the fuel is divided and injected by the pilot injection Ip and the main injection Im), at Step S3 (determining the basic injection timing Ta), each timing of the plurality of injections is determined. Moreover, in the following description, unless it is indicated otherwise, the injection timing indicates the timing of the main injection.

Figure 6:
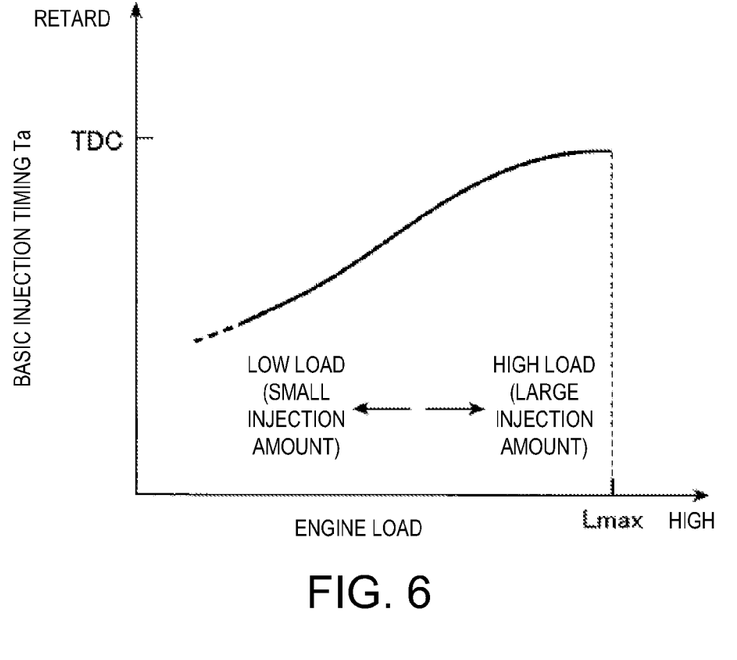
FIG. 6 is a chart showing a method of setting a fuel injection amount according to an engine load.

Under a condition in which the engine speed is fixed, as shown in FIG. 6, the basic injection timing Ta is set to retard more toward a higher engine load where the injection amount is larger. Specifically, in the example of FIG. 6, the basic injection timing Ta (the main injection timing when the injection is performed a plurality of times) is set to a timing which is advanced to some extent with respect to the compression TDC within a low engine load range, but it shifts from this timing to the retarding side as the engine load increases, and at the maximum engine load Lmax (the accelerator opening is 100%), it is set to near the compression TDC. The basic injection timing Ta is retarded as the engine load increases as described above so that required combustion energy is obtained within a high engine load range where a high torque is required, while preventing an excessive increase of a pressure inside the cylinder 11a (hereinafter, referred to as the in-cylinder pressure). Note that, although the basic injection timing Ta when the engine speed varies is different from FIG. 6, a tendency that the timing is retarded more toward the higher engine load remains similarly.

When the above-described setting of the basic injection timing Ta ends, the calculating module 10a determines whether a condition in which the engine speed is above a reference speed Nex indicated by the broken line in FIG. 3, and the intake air pressure is above a predetermined reference pressure INx based on the various information acquired at Step S1 (Step S4). Note that, the reference speed Nex is higher than an idle speed and is set to, for example, any speed between 1000 and 2000 rpm. Moreover, the reference pressure Inx is set to, for example, around 150 kPa.

The determination at Step S4 is for determining whether there is a possibility that the in-cylinder pressure of the engine body 1 increases excessively. Specifically, a state where the engine speed≥Nex and the intake air pressure≥INx is considered as a state where the turbocharging by the large turbocharger 61 is working effectively on some level. Because the turbine 61b of the large turbocharger 61 is large in size and mass, when the engine load is rapidly changed, the slowdown in rotation of the turbine 61b delays and temporarily causes an excessive turbocharging amount, and the in-cylinder pressure may be increased above an expected level. The determination at Step S4 is performed to determine whether there is such a possibility.

Figure 7A:
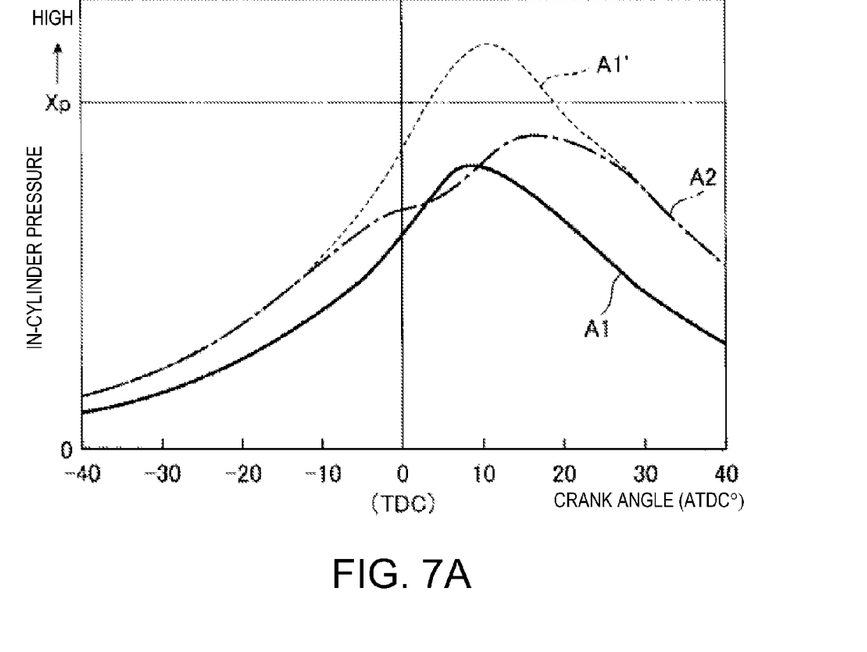
FIG. 7A is a chart showing a change of an in-cylinder pressure before and after a compression top dead center.
Figure 7B:
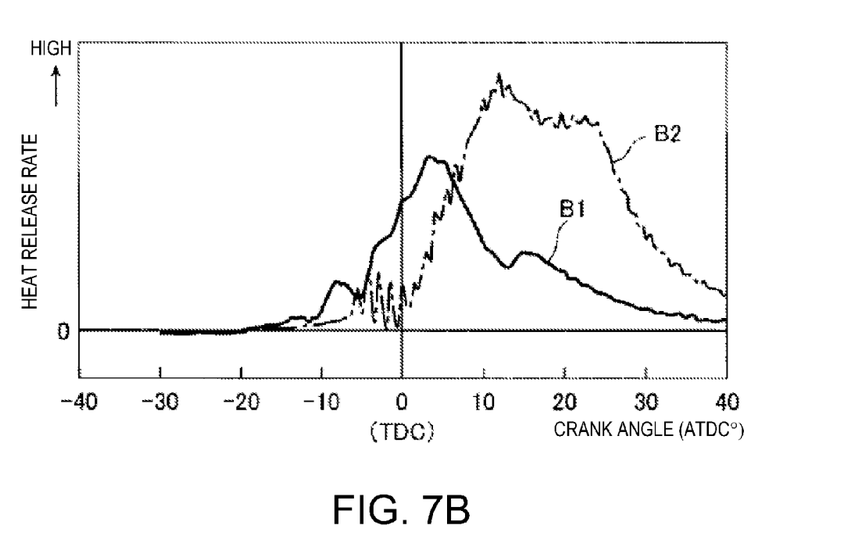
FIG. 7B is a chart showing a change of a heat release rate before and after the compression top dead center.

FIGS. 7A and 7B are charts showing changes of the in-cylinder pressure and a heat release rate before and after the compression TDC for cases where the engine load (required torque based on the accelerator opening) is high and low. Specifically, the waveform A1 in FIG. 7A and the waveform B1 in FIG. 7B indicate the in-cylinder pressure and the heat release rate when the engine is operated stably in a state with the accelerator opening of 50%, and the waveform A2 in FIG. 7A and the waveform B2 in FIG. 7B indicate the in-cylinder pressure and the heat release rate when the engine is operated stably in a state with the accelerator opening of 100% (full engine load), respectively. Note that, the engine speed is fixed to 3200 rpm in any data of the waveforms.

In the chart of the in-cylinder pressure shown in FIG. 7A, tops of the waveforms A1 and A2 are points where the in-cylinder pressure reaches its maximum, and each maximum value is referred to as a maximum in-cylinder pressure Pmax. Moreover, "Xp" indicated in the vertical axis of the chart shows an allowable value which is predetermined as an upper limit where the reliability of the engine can be secured considering the quality of a material and a strength of the engine body 1 (the pistons 14, the cylinder block 11, and the cylinder head 12).

As indicated by the waveform A2, even though the accelerator opening is 100% (full engine load), the maximum in-cylinder pressure Pmax falls below the allowable value Xp. This is because due to that the basic injection timing Ta is set to retard more toward the higher engine load (i.e., toward the larger injection amount) as described above (FIG. 6), the peak of the combustion when the accelerator opening is 100% (the top of the waveform B2 in FIG. 7B) is at a timing significantly more retarded than the compression TDC, and thus, the increase of the maximum in-cylinder pressure Pmax is suppressed.

On the other hand, when the accelerator opening is 50%, the basic injection timing Ta is relatively advanced (FIG. 6), but the fuel injection amount is small and the heat release rate is low. Therefore, as indicated by the waveform A1 in FIG. 7A, the maximum in-cylinder pressure Pmax when the accelerator opening is 50% is lower than the Pmax when the accelerator opening is 100%, and it obviously falls below the allowable value Xp.

Thus, regardless of the accelerator opening being 100% or 50%, as long as the engine is operated stably in that state, the maximum in-cylinder pressure Pmax will not exceed the allowable value Xp. However, for example, when the accelerator opening is reduced rapidly from 100% to 50% (i.e., when the engine load is rapidly shifted from the high engine load to the low engine load), the turbocharging pressure is temporarily kept at a high value while the basic injection timing Ta is rapidly advanced according to the rapid reduction. Therefore, as indicated in FIG. 7A as the waveform A1', the maximum in-cylinder pressure Pmax may exceed the allowable value Xp. Specifically, due to that the peak of the combustion comes close to the compression TDC by the advance of the injection timing, and a large amount of air compressed by the high supercharging pressure is introduced into the cylinder and compressed, the maximum in-cylinder pressure Pmax is increased excessively and may exceed the allowable value Xp. Especially, in this embodiment, because the large turbocharger 61 having the turbine 61b which is large in size and mass is provided to the engine, when the turbine 61b rotates at high speed within the high engine load range and the operating range is shifted to the low engine load range, the turbine 61b temporarily rotates by inertia even after the shifting, and thus, the turbocharging pressure remains high and the excessive increase of the maximum in-cylinder pressure Pmax as described above easily occurs.

In consideration of the above-described situation, at Step S4, it is determined whether the turbocharging by the large turbocharger 61 is effective based on the engine speed and the intake air pressure so as to determine whether the excessive increase of the maximum in-cylinder pressure Pmax may occur.

When it is confirmed that there is no possibility of the excessive increase of the in-cylinder pressure (Step S4: NO), the injection control module 10b of the PCM 10 performs a normal injection control of injecting the fuel from the injector 18 according to the basic injection timing Ta determined by the calculating module 10a at Step S3 (Step S8). Specifically, the injection operation of the injector 18 is controlled so that the fuel injection timing of the injector 18 is the same as the basic injection timing Ta determined by using the fuel injection map Mf based on the engine operating state (e.g., load and speed).

When it is confirmed that there is the possibility of the excessive increase of the in-cylinder pressure (Step S4: YES), the calculating module 10a calculates a safe injection timing at which the excessive increase of the in-cylinder pressure is not caused (Step S5). Specifically, a fuel injection timing at which the maximum in-cylinder pressure Pmax matches with the allowable value Xp is obtained based on the intake air amount, the intake air pressure, the intake air temperature, the speed, and the coolant temperature of the engine which are acquired at Step S1, and the injection amount and the injection pattern of the fuel which are determined at Step S2, and the obtained fuel injection timing is determined as the safe injection timing Tb. Note that, when the injection pattern includes a plurality of injections (e.g., the fuel is divided and injected by the pilot injection Ip and the main injection Im), the safe injection timing is calculated at least for the main injection Im.

Here, the safe injection timing Tb at which the maximum in-cylinder pressure Pmax matches with the allowable value Xp can be obtained by a predetermined equation derived based on, for example, experiments. For example, the timing at which the maximum in-cylinder pressure Pmax matches with the allowable value Xp is found by repeating combustion experiments and simulations under a plurality of conditions with different intake air amount, intake air pressure, intake air temperature, speed, and fuel injection amount of the engine, and based on a result thereof, a generalized equation for obtaining the injection timing at which the maximum in-cylinder pressure Pmax matches with the allowable value Xp (i.e., safe injection timing Tb) is set. In the control at Step S5, the safe injection timing Tb is obtained using the equation which is preset by such a method.

When the calculation of the safe injection timing Tb as described above ends, the calculating module 10a determines whether the calculated safe injection timing Tb is later than the basic injection timing Ta determined at Step S3 (Step S6).

When the safe injection timing Tb is confirmed to be later than the basic injection timing Ta (Step S6: YES), the injection control module 10b performs a safety injection control of injecting the fuel from the injector 18 at the safe injection timing Tb (Step S7). Specifically, the safe injection timing Tb being later than the basic injection timing Ta means that the maximum in-cylinder pressure Pmax exceeds the allowable value Xp if the fuel is injected at the basic injection timing Ta. Therefore, to avoid such a situation, at Step S7, the fuel is injected from the injector 18 at the safe injection timing Tb and not at the basic injection timing Ta.

On the other hand, when it is confirmed that the safe injection timing Tb is the same as or earlier than the basic injection timing Ta (Step S6: NO), the injection control module 10b performs the normal injection control of injecting the fuel from the injector 18 at the basic injection timing Ta determined at Step S3 (Step S8).

(4) Operation, etc.

As described above, with the diesel engine of this embodiment, while the engine is in operation, the safe injection timing Tb at which the maximum in-cylinder pressure Pmax matches with the allowable value Xp is calculated, and when the safe injection timing Tb is later than the basic injection timing Ta determined according to the operating state of the engine (e.g., load and speed), the safety injection control of injecting the fuel from the injector 18 at the safe injection timing Tb is performed. According to such a configuration, the engine is controlled so that the maximum in-cylinder pressure Pmax is always below the allowable value Xp. Therefore, for example, even if an excessive turbocharging amount is temporarily supplied due to the change of the engine load, the excessive increase of the maximum in-cylinder pressure Pmax is prevented and the engine can surely be protected from being damaged in its components, such as the piston 14 and the cylinder head 12.

Figure 8:
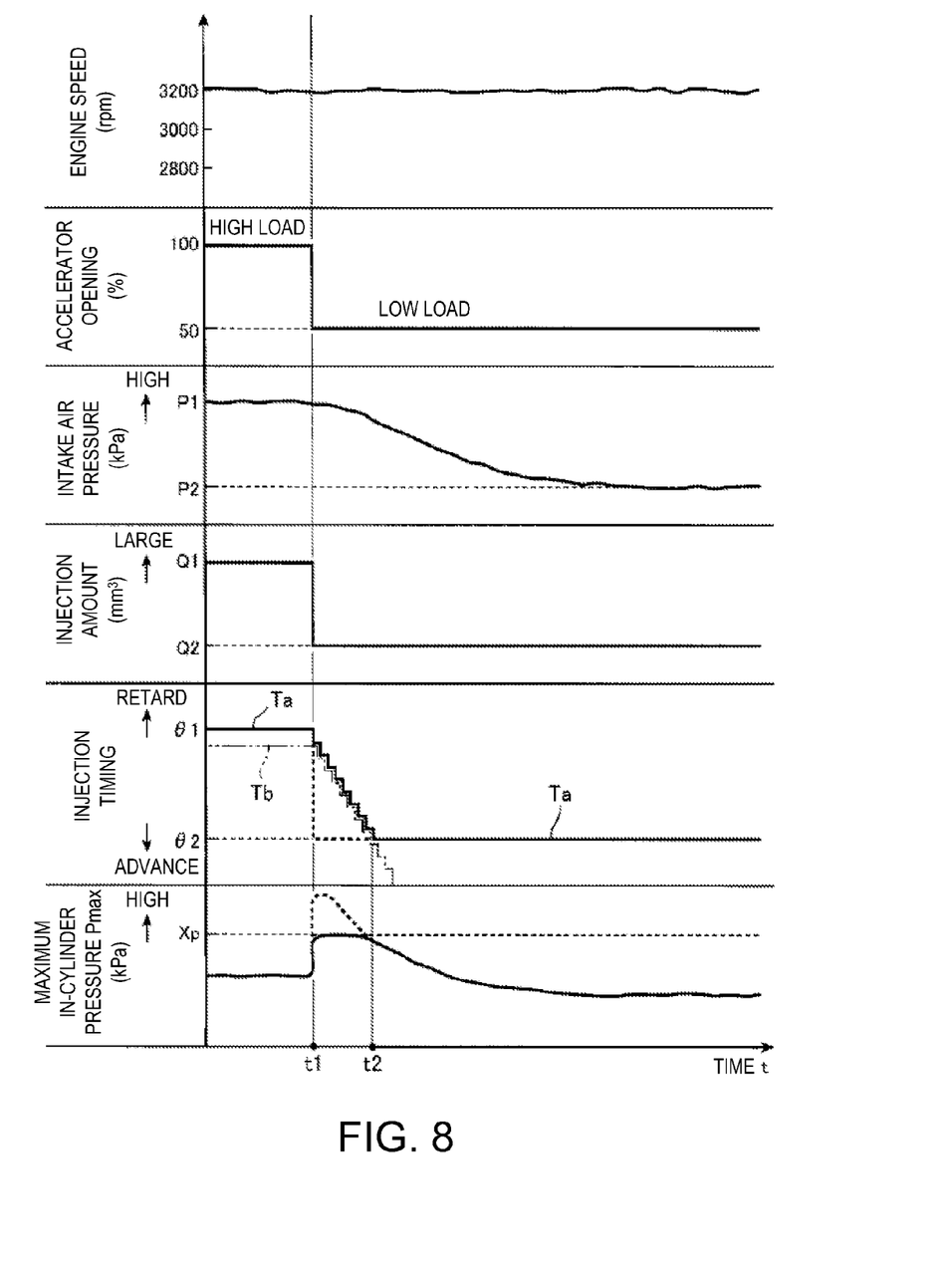
FIG. 8 is a time chart showing a result of an experiment performed to verify an operation of the present invention.

FIG. 8 is a time chart showing a result of an experiment performed to verify the above described operation. In this experiment, the accelerator opening is changed rapidly while the engine speed is fixed, and the changes of the various state amounts (the intake air pressure, the injection amount, the maximum in-cylinder pressure, and the injection timing) are checked before and after the accelerator opening is changed. Note that, with the engine used in the experiment, the fuel is injected in the injection pattern including the pilot injection Ip and the main injection Im (FIG. 5) at any time point in FIG. 8. "The injection timing" in FIG. 8 indicates the timing of the main injection Im.

In the experiment shown in FIG. 8, the engine is operated stably in the high engine load state where the accelerator opening is 100% until a time point t1, and at the time point t1, the accelerator opening is reduced rapidly from 100% to 50%. After the time point t1, the engine is operated stably at the low engine load with the accelerator opening of 50%. The engine speed is fixed at 3200 rpm regardless of before or after the time point t1.

The change of the operating state according to such an experiment is illustrated on the map in FIG. 3. The state before the time point t1 in FIG. 8 (the accelerator opening: 100% and the engine speed: 3200 rpm) corresponds to a point D1, and the state after the time point t1 (accelerator opening: 50%, engine speed: 3200 rpm) corresponds to a point D2. Both the points D1 and D2 belong to the second range B where only the large turbocharger 61 is operated, and it can be understood that the turbocharging amount by the large turbocharger 61 is large in the range.

As shown in FIG. 8, within the time period before the time point t1 at which the accelerator opening is 100%, the intake air pressure is P1, the fuel injection amount is Q1, and the injection timing (the main injection timing) is $\theta 1$. Note that, the injection amount Q1 and the injection timing $\theta 1$ are determined based on the fuel injection map Mf as the respective injection amount and injection timing according to the operating state where the accelerator opening is 100% and the engine speed is 3200 rpm. The injection timing $\theta 2$ matches with the basic injection timing Ta determined at Step S3 in FIG. 4, and at this point, the normal injection control is performed.

Further, at the time point t1, when the accelerator opening is rapidly reduced from 100% to 50%, simultaneously to this reduction, the fuel injection amount is rapidly reduced from Q1 to Q2. When the injection amount is thus reduced, originally, the fuel injection timing is rapidly advanced to the timing $\theta 2$ as indicated by the broken-line waveform in FIG. 8. In other words, when the injection amount is rapidly reduced to Q2 in correspondence to the accelerator opening being 50%, if using the above described fuel injection map Mf, the injection timing is rapidly advanced to $\theta 2$ in correspondence to the rapid reduction of the injection amount. However, practically, as indicated by the solid-line waveform, the injection timing is advanced between the time points t1 and t2 only gradually and not rapidly. This is because, between the time points t1 and t2, the safe injection timing Tb is adopted as the actual injection timing by calculating the safe injection timing Tb, which is calculated at Step S5 in FIG. 4, to be later than the basic injection timing Ta based on the fuel injection map Mf.

The two-dot chain line waveform in FIG. 8 indicates the safe injection timing Tb. As shown in FIG. 8, the safe injection timing Tb is more on the advancing side than the $\theta 1$ before the time point t1. Therefore, before the time point t1, the actual injection timing is set to $\theta 1$ which matches with the basic injection timing Ta. On the other hand, between the time points t1 and t2, the safe injection timing Tb is on the retarding side of the basic injection timing Ta for after the time point t2 (=$\theta 2$). Therefore, the actual injection timing between the time points t1 and t2 is not set to $\theta 2$ but to the safe injection timing Tb which is on the retarding side of $\theta 2$ (safety injection control).

The reason why the safe injection timing Tb is set on the retarding side of the basic injection timing Ta for after the time point t2 (=$\theta 2$) between the time points t1 and t2 as described above is considered to be because the turbocharging pressure by the large turbocharger 61 is kept at a high value even after the time point t1. Thus, as it can be understood from the waveform of the intake air pressure after the time point t1, the intake air pressure is reduced only gradually after the time point t1 at which the accelerator opening is rapidly reduced. This is because the turbine 61b of the large turbocharger 61 continues to rotate at high speed even after the time point t1, and the high turbocharging pressure is kept. Specifically, the turbine 61b which is large in size and mass continues to rotate at the high speed temporarily by inertia even if the exhaust energy is reduced by the rapid reduction of the accelerator opening (injection amount). It is considered that this is the reason why the intake air pressure is only reduced gradually after the time point t1, and further, the safe injection timing Tb is calculated to be relatively late because of the reduction delay of the intake air pressure. Due to the reasons described above, in FIG. 8, the safety injection control of injecting the fuel at the safe injection timing Tb on the retarding side of the basic injection timing Ta is performed between the time points t1 and t2.

Then, after the time point t2, the safe injection timing Tb is shifted to be more advanced than the basic injection timing Ta again. Therefore, the actual injection timing is set to the timing $\theta 2$ which matches with the basic injection timing Ta (normal injection control).

The bottom row in FIG. 8 shows the change of the maximum in-cylinder pressure Pmax. As shown in FIG. 8, the maximum in-cylinder pressure Pmax is suppressed below the allowable value Xp at any time point as a result of the control of the injection timing as described above. On the other hand, when the safety injection control between the time points t1 and t2 is not performed, as indicated by the broken line waveform, the maximum in-cylinder pressure Pmax exceeds the allowable value Xp, and it causes a problem in securing the reliability of the engine.

As described above, with the diesel engine of this embodiment, when the engine load is shifted from the high engine load to the low engine load (the time point t1 in FIG. 8), the safety injection control of injecting the fuel at the safe injection timing Tb on the retarding side of the basic injection timing Ta is performed only for a predetermined period of time from the shifting (between t1 and t2). Therefore, even if the turbocharging amount temporarily becomes excessively large due to the response delay of the large turbocharger 61, avoided chance that the maximum in-cylinder pressure Pmax exceeds the allowable value Xp is reduced, and the reliability of the engine can be improved.

Note that, although the data of, for example, the injection amount and the injection timing when the accelerator opening is reduced from 100% to 50% is shown in FIG. 8, obviously, data with a similar tendency may also be obtained by other accelerator operation. In either case, mainly within the engine speed range where the large turbocharger 61 is operated (in this embodiment, the engine speed range above the reference speed Nex in FIG. 3), when the engine load is shifted from the high engine load to the low engine load, similar to between the time points t1 and t2 in FIG. 8, the safety injection control of temporarily delaying the injection timing may be performed. Note that, in this case, "the high engine load" and "the low engine load" mean that there exists some level of difference in the engine load, and the absolute value of the difference is not particularly concerned. Specifically, when there is over a predetermined level of drop in the engine load direction (e.g., over 30% of difference in the accelerator opening), the higher value is the high engine load, and the lower value is the low engine load.

Moreover, with the diesel engine of this embodiment, the geometric compression ratio of the engine body 1 is set to 14:1, unlike the conventional diesel engine (generally, the compression ratio is 18:1 or higher), the maximum in-cylinder pressure Pmax can be suppressed. Moreover, in this embodiment, because the excessive increase of the maximum in-cylinder pressure Pmax is suppressed by the safety injection control, the strength required for the engine body 1 can be reduced compared to the conventional engine, and the reduction in weight and cost of the engine can be achieved.

Moreover, in this embodiment, at least within a part of the operating range, the main injection Im causing the main combustion that is started near the compression TDC, and the pilot injection Ip causing the preliminary combustion before the main combustion are performed. By performing the pilot injection Ip preceding to the main injection Im as described above, even with the diesel engine of this embodiment with the low geometric compression ratio of 14:1, the ignitability of the fuel is improved and a misfire can surely be prevented.

Additionally, in this embodiment, the fuel injection timing at which the maximum in-cylinder pressure Pmax matches with the allowable value Xp is obtained by the calculation based on the respective parameters including the intake air amount, the intake air pressure, the intake air temperature, the speed, the coolant temperature, the fuel injection amount, and the injection pattern of the engine, and the obtained fuel injection timing is determined to be the safe injection timing Tb. Therefore, in the safety injection control, the fuel can be injected at the limit timing at which the maximum in-cylinder pressure Pmax does not exceed the allowable value Xp, and a power down of the engine caused due to the injection timing being retarded more than necessary can effectively be prevented.

Note that, in this embodiment, as shown in FIG. 3, both large and small turbochargers 61 and 62 are operated within the first range A on the relatively low engine speed side, and only the large turbocharger 61 is operated within the second range B on the relatively high engine speed side; however, within the first range A on the relatively low engine speed side, the large turbocharger 61 may be stopped and only the small turbocharger 62 may be operated (i.e., the wastegate valve 65a is fully opened). When the large turbocharger 61 is only operated within the second range B on the high engine speed side as described above, the calculation of the safe injection timing Tb (Step S5 in FIG. 4) is only performed during the operation within the second range B. Specifically, if the large turbocharger 61 is only operated within the second range B, the risk of the excessive increase of the maximum in-cylinder pressure Pmax arises only within the second range B. Thus, the calculation of the safe injection timing Tb is only performed within the second range B, and the safety injection control (the fuel injection at the timing Tb) is performed as needed. In either case, with a diesel engine as in this embodiment which is provided with two kinds of turbochargers including the large and small turbochargers 61 and 62, the safety injection control is performed at least when the large turbocharger 61 is substantially operated.

Moreover, alternatively to the configuration of this embodiment in which the two kinds of turbochargers including the large and small turbochargers 61 and 62 are provided to the engine, a configuration in which one kind of turbocharger is provided to the engine may be adopted. Also in this case, the problem of the excessive increase of the maximum in-cylinder pressure Pmax due to the slowdown delay of the turbine rotation may arise similarly on one level or another because the turbine of the turbocharger needs to be large to some extent unless the turbine is set to emphasize in operating at low engine speed. Therefore, as long as the engine has a turbocharger, the configuration of this embodiment in which the injection timing is temporarily retarded when shifting from the high engine load to the low engine load can be applied regardless of the number of the turbochargers.

Moreover, in this embodiment, the safe injection timing Tb which is the fuel injection timing at which the maximum in-cylinder pressure Pmax matches with the allowable value Xp, is obtained by the calculation based on the respective parameters including the intake air amount, the intake air pressure, the intake air temperature, the speed, the coolant temperature, the fuel injection amount, and the injection pattern of the engine; however, the safe injection timing Tb is not necessarily obtained based on all these parameters. For example, when occasions where the calculation of the safe injection timing Tb is required are limited (i.e., potential operating conditions in which the maximum in-cylinder pressure Pmax temporarily exceeds the allowable value Xp are limited), the safe injection timing Tb may be obtained without one or more of the parameters. However, at least the intake air pressure and the fuel injection amount need to be considered, and the equation for obtaining the safe injection timing Tb necessarily includes these two parameters (the intake air pressure and the fuel injection amount).

Moreover, in this embodiment, when the pattern of the fuel injection has a plurality of injections including the pilot injection Ip and the main injection Im, the safe injection timing Tb is calculated at least for the main injection Im, and the timing of the main injection Im is retarded to the safe injection timing Tb as needed; however, the target of delaying the injection timing for is not limited to the main injection Im but may be the pilot injection Ip. The maximum in-cylinder pressure Pmax is most influenced by the timing of the main injection Im performed near the compression TDC, but it may also be slightly influenced by the timing of the pilot injection Ip. In this case, the maximum in-cylinder pressure Pmax can be reduced by retarding the timing of the pilot injection Ip.

Furthermore, in this embodiment, the geometric compression ratio of the diesel engine is set to 14:1; however, the configuration of this embodiment can also suitably be applied to diesel engines with other geometric compression ratios. However, for example, if a weight reduction is attempted by reducing the geometric compression ratio below the conventional diesel engines, the geometric compression ratio of the diesel engine should be at least below 16:1. On the other hand, based on the limit of the ignitability of the fuel, it is considered that the geometric compression ratio is required to be 12:1 or higher. In view of the above situations, in the present invention, the geometric compression ratio of the diesel engine is desired to be 12:1 or higher but below 16:1.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine Body
10a Calculating Module
10b Injection Control Module
11a Cylinder
18 Injector
61 Large Turbocharger
62 Small Turbocharger
Nex Reference Speed
Ta Basic Injection Timing
Tb Safe Injection Timing
Pmax Maximum In-Cylinder Pressure
Xp Allowable Value
Ip Pilot Injection
Im Main Injection

The invention claimed is:

1. A control device of a diesel engine including an injector for injecting fuel into a cylinder, and a turbocharger for compressing intake air by using exhaust energy,
the device being operatively coupled to an accelerator position sensor configured to detect an accelerator pedal position,
the device comprising:
a calculating module for setting a low load basic injection timing and a high load basic injection timing determined according to an operating state of the engine, as a timing of injecting the fuel from the injector; and
an injection control module for injecting the fuel from the injector at the set basic injection timings at least while the engine is in a steady operation,
wherein, under a condition in which an engine speed is fixed, the low load basic injection timing when an engine load is low is set to be more advanced than the high load basic injection timing when the engine load is high, and
wherein the injection control module performs a safety injection control of injecting the fuel at a safe injection timing that is set to be more retarded than the low load basic injection timing, only for a transition time period when the engine load is shifted from the high engine load, corresponding to a first accelerator pedal position, to the low engine load, corresponding to a second accelerator pedal position less depressed than the first accelerator pedal position, the transition time period beginning at a first time point when fuel is injected at the high load basic injection timing, and ending at a second time point when fuel is injected at the low load basic injection timing,
wherein the calculating module calculates maximum in-cylinder pressures at a plurality of fuel injection timings, and for the transition time period, estimates an estimated threshold-exceeding fuel injection timing, at which the in-cylinder pressure of the engine is predicted to exceed a predetermined allowable value for the engine, and sets the safe injection timing based on the estimated threshold-exceeding fuel injection timing,
wherein the injection control module performs the safety injection control of injecting the fuel at the safe injection timing based on the estimated threshold-exceeding fuel injection timing,
wherein the calculating module estimates the estimated threshold-exceeding fuel injection timing based on various parameters including at least an intake air pressure of the engine and an injection amount of the fuel, and
wherein the injection control module performs the safety injection control of progressively advancing the safe injection timing between the first time point and the second time point from the high load basic injection timing to the low load basic injection timing, so that fuel injection is performed multiple times at a plurality of injection timings, each successive injection timing being more advanced than the preceding injection timing, during the transition time period.

2. The device of claim 1, wherein the injection control module performs the safety injection control when the engine speed is above a reference speed that is higher than an idle speed and the engine load is shifted from the high engine load to the low engine load.

3. The device of claim 2, wherein the turbocharger includes a small turbocharger and a large turbocharger which is larger than the small turbocharger, and
wherein the large turbocharger is operated at least when the engine speed is above the reference speed.

4. The device of claim 2, wherein the safe injection timing is determined by the calculating module in consideration of a maximum in-cylinder pressure that is a maximum in-cylinder pressure of the engine, and
wherein, based on various parameters including at least an intake air pressure of the engine and an injection amount of the fuel, the calculating module calculates, as the safe injection timing, a fuel injection timing at which the maximum in-cylinder pressure matches with a predetermined allowable value.

5. The device of claim 3, wherein the safe injection timing is determined by the calculating module in consideration of a maximum in-cylinder pressure that is a maximum in-cylinder pressure of the engine, and
wherein, based on various parameters including at least an intake air pressure of the engine and an injection amount of the fuel, the calculating module calculates, as the safe injection timing, a fuel injection timing at which the maximum in-cylinder pressure matches with a predetermined allowable value.

6. The device of claim 1, wherein a geometric compression ratio of the engine is set below 16:1.

7. The device of claim 6, wherein the injection control module performs a main injection causing a main combustion that is started near a compression top dead center, and a pilot injection causing a preliminary combustion before the main combustion, and wherein the safety injection timing set in the safety injection control includes at least a timing of the main injection.

8. The device of claim 2, wherein a geometric compression ratio of the engine is set below 16:1.

9. The device of claim 8, wherein the injection control module performs a main injection causing a main combustion that is started near a compression top dead center, and a pilot injection causing a preliminary combustion before the main combustion, and wherein the safety injection timing set in the safety injection control includes at least a timing of the main injection.

10. The device of claim 3, wherein a geometric compression ratio of the engine is set below 16:1.

11. The device of claim 10, wherein the injection control module performs a main injection causing a main combustion that is started near a compression top dead center, and a pilot injection causing a preliminary combustion before the main combustion, and wherein the safety injection timing set in the safety injection control includes at least a timing of the main injection.

12. The device of claim 4, wherein a geometric compression ratio of the engine is set below 16:1.

13. The device of claim 12, wherein the injection control module performs a main injection causing a main combustion that is started near a compression top dead center, and a pilot injection causing a preliminary combustion before the main combustion, and wherein the safety injection timing set in the safety injection control includes at least a timing of the main injection.

14. The device of claim 4, wherein a geometric compression ratio of the engine is set below 16:1.

15. The device of claim 14, wherein the injection control module performs a main injection causing a main combustion that is started near a compression top dead center, and a pilot injection causing a preliminary combustion before the main combustion, and wherein the safety injection timing set in the safety injection control includes at least a timing of the main injection.

16. The device of claim 5, wherein a geometric compression ratio of the engine is set below 16:1.

17. The device of claim 16, wherein the injection control module performs a main injection causing a main combustion that is started near a compression top dead center, and a pilot injection causing a preliminary combustion before the main combustion, and wherein the safety injection timing set in the safety injection control includes at least a timing of the main injection.

* * * * *